(12) United States Patent
Pletz et al.

(10) Patent No.: US 7,406,426 B1
(45) Date of Patent: *Jul. 29, 2008

(54) SYSTEM AND METHOD FOR INTEGRATED CUSTOMER MANAGEMENT

(75) Inventors: Tracy Pletz, Wilmington, DE (US); William T. Callahan, Glen Mills, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,530

(22) Filed: Aug. 17, 2006

Related U.S. Application Data

(63) Continuation of application No. 11/227,597, filed on Sep. 15, 2005, which is a continuation of application No. 09/474,771, filed on Dec. 30, 1999, now Pat. No. 6,965,865, application No. 11/505,530, filed on Aug. 17, 2006, which is a continuation of application No. 11/227,952, filed on Sep. 15, 2005, now Pat. No. 7,269,567, which is a continuation of application No. 09/474,771, filed on Dec. 30, 1999, now Pat. No. 6,965,865.

(51) Int. Cl.
*G06F 17/60* (2006.01)
(52) U.S. Cl. .............................. 705/1; 705/9
(58) Field of Classification Search ............ 705/1, 705/9
See application file for complete search history.

(56) References Cited

U.S. PATENT DOCUMENTS

| | | |
|---|---|---|
| 4,321,672 A | 3/1982 | Braun et al. |
| 4,355,372 A | 10/1982 | Goldberg |
| 4,495,018 A | 1/1985 | Vohrer |
| 4,633,397 A | 12/1986 | Macco |
| 4,694,397 A | 9/1987 | Grant et al. |
| 4,722,054 A | 1/1988 | Yorozu et al. |
| 4,745,468 A | 5/1988 | Von Kohorn |
| 4,752,877 A | 6/1988 | Roberts et al. |
| 4,774,664 A | 9/1988 | Campbell et al. |
| 4,797,911 A | 1/1989 | Szlam et al. |
| 4,812,628 A | 3/1989 | Boston |
| 4,914,587 A | 4/1990 | Clouse |

(Continued)

FOREIGN PATENT DOCUMENTS

JP  7-152960  6/1995

(Continued)

OTHER PUBLICATIONS

Delivering the Right Information to the Right Resource or Every Customer Interaction; Intelligent Callrouter, www.geotel.com/solutions/icr/default/htm, 1998, 1 page.

(Continued)

*Primary Examiner*—Pierre Eddy Elisca
(74) *Attorney, Agent, or Firm*—Hunton & Williams LLP

(57) ABSTRACT

An automated system and method for customer management deploys customer databases to profile customer service requests for distribution to appropriately assigned agent representatives. The representatives adopt particular roles according to customer care volume, inquiry type, time of day and other customer management needs. Consumer profiles may be accessed in real time to combine customer care events with cross-selling and other promotions related to the consumer's transaction history and other factors.

5 Claims, 12 Drawing Sheets

| | |
|---|---|
| ENTERTAINMENT | FIND ME |
| RESTAURANT | PRODUCT INFORMATION |
| EVENTS/ACTIVITIES | BUSINESS |
| EVENT PLANNING | SERVICES |
| GIFTS | OTHER INFORMATION |
| | |
| FINANCIAL | |
| NEW HOME MORTGAGE | TRAVEL |
| REFINANCE EXISTING HOME | TRAVEL ARRANGEMENT |
| HOME EQUITY LOAN | VACATION SUGGESTIONS |
| INVESTMENTS | TRAVEL INFORMATION |
| CREDIT CARD SERVICES | |
| OTHER FINANCIAL SERVICES (FORMERLY OTHER SERVICES) | |

U.S. PATENT DOCUMENTS

| | | | |
|---|---|---|---|
| 4,926,255 | A | 5/1990 | Von Kohorn |
| 4,932,046 | A | 6/1990 | Katz et al. |
| 4,948,174 | A | 8/1990 | Thomson et al. |
| 4,972,504 | A | 11/1990 | Daniel, Jr. |
| 4,974,878 | A | 12/1990 | Josephson |
| 5,041,972 | A | 8/1991 | Frost |
| 5,050,207 | A | 9/1991 | Hitchcock |
| 5,121,945 | A | 6/1992 | Thomson et al. |
| 5,157,717 | A | 10/1992 | Hitchcock |
| 5,179,584 | A | 1/1993 | Tsumura |
| 5,220,501 | A | 6/1993 | Lawlor |
| 5,225,978 | A | 7/1993 | Petersen |
| 5,259,023 | A | 11/1993 | Katz |
| 5,260,778 | A | 11/1993 | Kauffman |
| 5,287,269 | A | 2/1994 | Dorrough et al. |
| 5,383,113 | A | 1/1995 | Knight |
| 5,402,474 | A | 3/1995 | Miller |
| 5,424,938 | A | 6/1995 | Wagner |
| 5,465,206 | A | 11/1995 | Hilt et al. |
| 5,483,445 | A | 1/1996 | Pickering |
| 5,490,060 | A | 2/1996 | Malec |
| 5,523,942 | A | 6/1996 | Tyler |
| 5,532,920 | A | 7/1996 | Hartrick |
| 5,555,299 | A | 9/1996 | Maloney et al. |
| 5,559,855 | A | 9/1996 | Dowens et al. |
| 5,561,707 | A | 10/1996 | Katz |
| 5,570,465 | A | 10/1996 | Tsakanikas |
| 5,583,759 | A | 12/1996 | Geer |
| 5,594,791 | A | 1/1997 | Szlam et al. |
| 5,599,528 | A | 2/1997 | Igaki |
| 5,615,341 | A | 3/1997 | Agrawal et al. |
| 5,652,786 | A | 7/1997 | Rogers |
| 5,659,165 | A | 8/1997 | Jennings |
| 5,684,863 | A | 11/1997 | Katz |
| 5,699,528 | A | 12/1997 | Hogan |
| 5,710,889 | A | 1/1998 | Clark et al. |
| 5,715,298 | A | 2/1998 | Rogers |
| 5,715,450 | A | 2/1998 | Ambrose |
| 5,727,153 | A | 3/1998 | Powell |
| 5,742,775 | A | 4/1998 | King |
| 5,745,706 | A | 4/1998 | Wolfberg et al. |
| 5,757,904 | A | 5/1998 | Anderson |
| 5,758,126 | A | 5/1998 | Daniels et al. |
| 5,761,647 | A | 6/1998 | Boushy |
| 5,765,142 | A | 6/1998 | Allred et al. |
| 5,787,403 | A | 7/1998 | Randle |
| 5,793,846 | A | 8/1998 | Katz |
| 5,794,221 | A | 8/1998 | Egendorf |
| 5,802,498 | A | 9/1998 | Comesanas |
| 5,802,499 | A | 9/1998 | Sampson et al. |
| 5,815,551 | A | 9/1998 | Katz |
| 5,819,238 | A | 10/1998 | Fernholz |
| 5,826,241 | A | 10/1998 | Stein |
| 5,832,447 | A | 11/1998 | Rieker |
| 5,832,460 | A | 11/1998 | Bednar |
| 5,835,087 | A | 11/1998 | Herz |
| 5,835,580 | A | 11/1998 | Fraser |
| 5,835,603 | A | 11/1998 | Coutts |
| 5,842,211 | A | 11/1998 | Horadan |
| 5,862,223 | A | 1/1999 | Walker |
| 5,870,456 | A | 2/1999 | Rogers |
| 5,870,721 | A | 2/1999 | Norris |
| 5,870,724 | A | 2/1999 | Lawlor |
| 5,873,072 | A | 2/1999 | Kight |
| 5,875,437 | A | 2/1999 | Atkins |
| 5,884,032 | A * | 3/1999 | Bateman et al. ............. 709/204 |
| 5,884,288 | A | 3/1999 | Chang |
| 5,890,140 | A | 3/1999 | Clark et al. |
| 5,897,625 | A | 4/1999 | Gustin |
| 5,899,982 | A | 5/1999 | Randle |
| 5,903,881 | A | 5/1999 | Schrader |
| 5,920,847 | A | 7/1999 | Kolling et al. |
| 5,923,745 | A | 7/1999 | Hurd |
| 5,940,811 | A | 8/1999 | Norris |
| 5,943,656 | A | 8/1999 | Crooks |
| 5,953,406 | A | 9/1999 | LaRue et al. |
| 5,966,695 | A | 10/1999 | Melchione et al. |
| 5,966,698 | A | 10/1999 | Pollin |
| 5,970,467 | A | 10/1999 | Alavi |
| 5,974,396 | A | 10/1999 | Anderson |
| 5,978,780 | A | 11/1999 | Watson |
| 5,987,435 | A | 11/1999 | Weiss et al. |
| 5,991,750 | A | 11/1999 | Watson |
| 5,995,942 | A | 11/1999 | Smith et al. |
| 5,995,948 | A | 11/1999 | Whitford |
| 6,006,207 | A | 12/1999 | Mumick et al. |
| 6,016,344 | A | 1/2000 | Katz |
| 6,016,482 | A | 1/2000 | Molinari et al. |
| 6,018,722 | A | 1/2000 | Ray et al. |
| 6,026,370 | A | 2/2000 | Jermyn |
| 6,029,139 | A | 2/2000 | Cunningham et al. |
| 6,032,125 | A | 2/2000 | Ando |
| 6,038,552 | A | 3/2000 | Fleischl et al. |
| 6,049,782 | A | 4/2000 | Gottesman et al. |
| 6,055,510 | A | 4/2000 | Henrick |
| 6,058,378 | A | 5/2000 | Clark et al. |
| 6,070,147 | A | 5/2000 | Harms et al. |
| 6,078,892 | A | 6/2000 | Anderson et al. |
| 6,088,685 | A | 7/2000 | Kiron et al. |
| 6,098,052 | A | 8/2000 | Kosiba et al. |
| 6,100,891 | A | 8/2000 | Thorne |
| 6,101,486 | A | 8/2000 | Roberts et al. |
| 6,148,293 | A | 11/2000 | King |
| 6,151,584 | A | 11/2000 | Papierniak et al. |
| 6,157,924 | A | 12/2000 | Austin |
| 6,212,178 | B1 | 4/2001 | Beck et al. |
| 6,226,623 | B1 | 5/2001 | Schein et al. |
| 6,230,287 | B1 | 5/2001 | Pinard et al. |
| 6,233,332 | B1 | 5/2001 | Anderson et al. |
| 6,233,566 | B1 | 5/2001 | Levine et al. |
| 6,278,981 | B1 | 8/2001 | Dembo et al. |
| 6,301,567 | B1 | 10/2001 | Leong et al. |
| 6,304,653 | B1 | 10/2001 | O'Neil et al. |
| 6,304,858 | B1 | 10/2001 | Mosler et al. |
| 6,321,212 | B1 | 11/2001 | Lange |
| 6,338,047 | B1 | 1/2002 | Wallman |
| 6,393,409 | B2 | 5/2002 | Young et al. |
| 6,405,179 | B1 | 6/2002 | Rebane |
| 6,415,267 | B1 | 7/2002 | Hagan |
| 6,418,419 | B1 | 7/2002 | Nieboer et al. |
| 6,430,545 | B1 | 8/2002 | Honarvar et al. |
| 6,456,983 | B1 | 9/2002 | Keyes et al. |
| 6,480,850 | B1 | 11/2002 | Veldhuisen |
| 6,513,019 | B2 | 1/2003 | Lewis |
| 6,553,113 | B1 | 4/2003 | Dhir et al. |
| 6,578,015 | B1 | 6/2003 | Haseltine et al. |
| 6,658,393 | B1 | 12/2003 | Basch et al. |
| 6,804,346 | B1 | 10/2004 | Mewhinney |
| 6,965,865 | B2 | 11/2005 | Pletz et al. |
| 2001/0032158 | A1 | 10/2001 | Starkman |
| 2001/0032159 | A1 | 10/2001 | Starkman |
| 2001/0032176 | A1 | 10/2001 | Starkman |
| 2001/0034682 | A1 | 10/2001 | Knight et al. |
| 2001/0042034 | A1 | 11/2001 | Elliott |
| 2001/0044293 | A1 | 11/2001 | Morgan |
| 2001/0047489 | A1 | 11/2001 | Ito et al. |
| 2002/0026394 | A1 | 2/2002 | Savage et al. |
| 2002/0059141 | A1 | 5/2002 | Davies et al. |
| 2003/0101119 | A1 | 5/2003 | Persons et al. |
| 2003/0163403 | A1 | 8/2003 | Chen et al. |
| 2003/0208441 | A1 | 11/2003 | Poplawski et al. |
| 2004/0252823 | A1* | 12/2004 | Becerra et al. ......... 379/265.13 |

2005/0135593 A1   6/2005   Becerra et al.

FOREIGN PATENT DOCUMENTS

| JP | 2007088822 A | * | 4/2007 |
| WO | WO 01/86524 | | 11/2001 |

OTHER PUBLICATIONS

Global Corruption Report 2004, Transparency International, Pluto Press, www.globalcorrupt, ISBN 07453 2231, Jun. 26, 2005.

Rial, Astrid, How to Monitor Collectors, Credit Card Management, Jul. 2000, vol. 13, Iss. 3:p. 65, 4 pages.

Keep the Change Savings Service, Bank of America, Retrieved from the internet on Jan. 27, 2006 at <https://www.bankofamerica.com/deposits/checksave/apps/ktc/ktc_terms.cfm>.

Computer Telephony Solutions, The Customer Interaction Specialists, Computer Telephony Solutions, Internet, May 25, 1999.

* cited by examiner

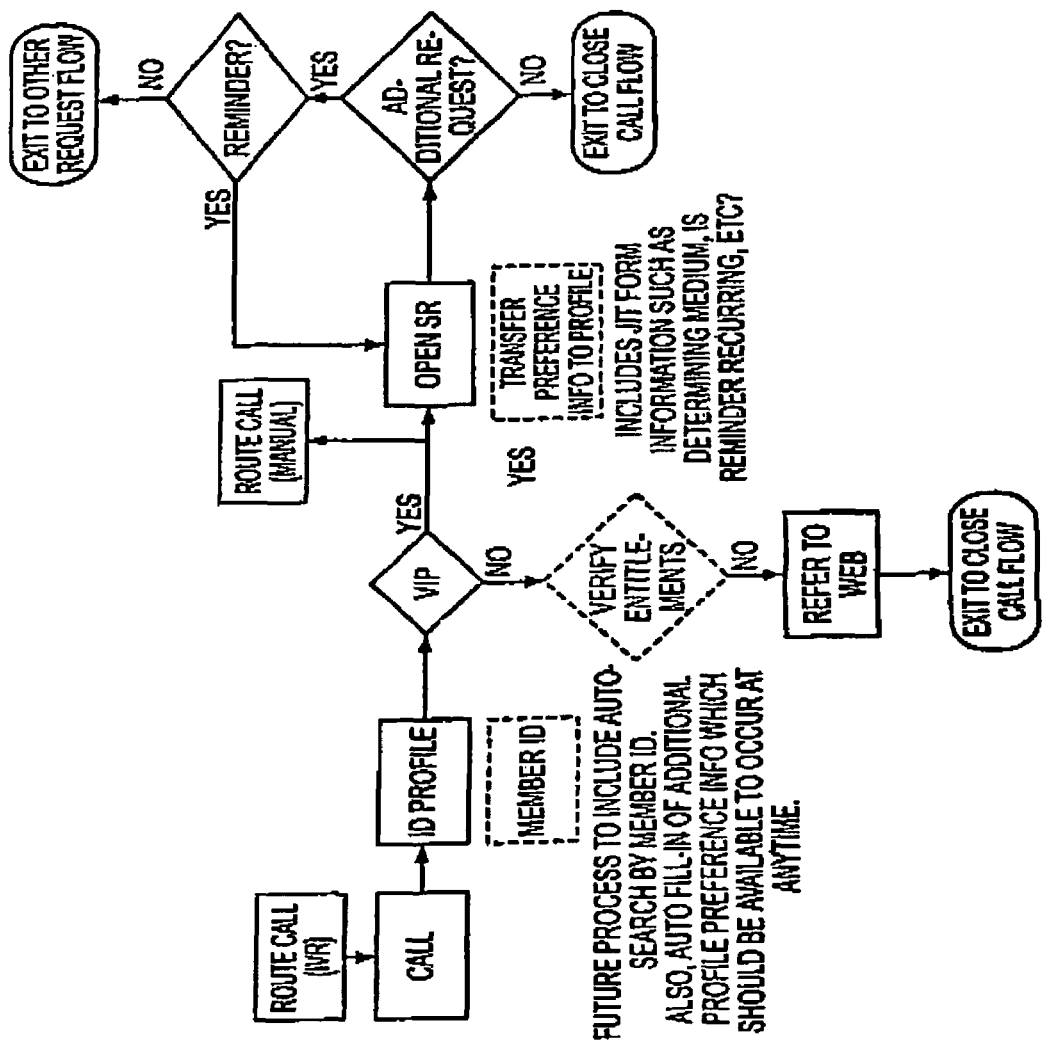

| | |
|---|---|
| ENTERTAINMENT | FIND ME |
| RESTAURANT | PRODUCT INFORMATION |
| EVENTS/ACTIVITIES | BUSINESS |
| EVENT PLANNING | SERVICES |
| GIFTS | OTHER INFORMATION |
| FINANCIAL | TRAVEL |
| NEW HOME MORTGAGE | TRAVEL ARRANGEMENT |
| REFINANCE EXISTING HOME | VACATION SUGGESTIONS |
| HOME EQUITY LOAN | TRAVEL INFORMATION |
| INVESTMENTS | |
| CREDIT CARD SERVICES | |
| OTHER FINANCIAL SERVICES (FORMERLY OTHER SERVICES) | |

FIG. 9

SYSTEM AND METHOD FOR INTEGRATED CUSTOMER MANAGEMENT

RELATED APPLICATIONS

This application is a continuation of U.S. patent application Ser. No. 11/227,597 filed on Sep. 15, 2005, which is a continuation of U.S. patent application Ser. No. 09/474,771 filed on Dec. 30, 1999, now U.S. Pat. No. 6,965,865. This application is also a continuation of U.S. patent application Ser. No. 11/227,952 filed on Sep. 15, 2005, now U.S. Pat. No. 7,269,567 which is a continuation of U.S. patent application Ser. No. 09/474,771 filed on Dec. 30, 1999, now U.S. Pat. No. 6,965,865. The specifications of these applications and patent are incorporated by reference in their entireties.

FIELD OF THE INVENTION

The invention relates to a system and method for comprehensive customer management that support customer inquiries, promotions and other customer care operations. More specifically, the system and method provide a managed workflow and routing process which ensures that customer requests are handled quickly and efficiently, with value-added options and customer preferences.

BACKGROUND OF THE INVENTION

Existing customer call centers and other customer care facilities enable customer service representative (CSRs) to serve incoming and outgoing consumer calls for sales, technical support, account inquiry and other purposes. Most customer call centers distribute the calls to whichever representative happens to be available at the time of the call. However, this randomly assigned representative may not be the most appropriately skilled agent to address the consumer's request. Thus, if the representative must transfer the call, he or she must determine what skills will best serve the consumer's needs, which other representative possesses such skills, and which among the suitable representatives are available to handle a transfer of the call.

Another disadvantage of telephone-based support centers is that they require the representative to manipulate complex computer screens while attempting to retrieve information needed to address the consumer's request. In order to process the consumer's request, the representative must record a great deal of information about the call. Thus, in some systems, it is at the sole discretion of the representative to remember the important details of the call and to decide what information about the call is entered into the system, all in real time.

Moreover, during the servicing of a customer inquiry significant opportunities for promotional cross-selling or up-marketing may be ignored or lost. For instance, customers inquiring about an airline or hotel charge may be receptive to future hotel promotions or travel incentives, for example linked to branded credit card accounts. However, customer care facilities rarely if ever capitalize on the marketing potential of such automated, valet-like value added services.

These examples illustrate some of the difficulties and lost opportunities in the operation of present customer care centers.

SUMMARY OF THE INVENTION

The invention is directed to a system and method for comprehensive customer management that support a suite of integrated customer management operations. The invention is incorporated in one embodiment in the commercially known as the AT YOUR REQUEST (AYR) System. The invention may automate the customer service process from end to end by analyzing consumer profile information in an effort to reduce per service member costs, increase card or other member satisfaction and retention, and increase revenues through increased member patronage. The invention may be employed in one embodiment to service the customer membership of a bank, merchant, telecommunications or other credit card vendors.

The invention allows the receipt of customer inquires using a variety of communication modes and message formats, and automates the flow of consumer requests to ensure that requests are handled quickly and efficiently. The invention in one regard guarantees a 48-hour turnaround response time for e-mail and telephone requests, and a 24-hour turnaround response time for requests received over the Web.

An object of the invention is consequently to provide a management tool to open up additional streams of revenue to generate increased profits for the customer service provider, as well as to benefit the customer base with increased convenience and options.

Another object of the invention is to improve the customer service provider's overall asset base and ability to penetrate existing and new target markets.

A further object of the invention is to provide a customer service organization with a uniform system for effectively managing the information that a customer call or other care center receives and generates.

Another object of the invention is to provide a service provider with a better method of learning about and understanding the most profitable segment of its market, which is typically its existing client base.

The invention may utilize at least the following features or components alone or together to support these and other objectives:

A comprehensive customer profile database.

A comprehensive research repository.

A response generation template and integrated tools (i.e., word processing and spell checking features).

Self-service support options (external AYR).

A managed workflow and routing system.

Business reporting capabilities.

The ability to analyze customer profile information in order to proactively up-sell, cross-sell, or provide enhanced servicing to consumers.

An ability to identify each consumer's needs, preferences, or values and use this information to correctly route the consumer's request to the most appropriately skilled representative.

The ability to enhance consumer relationships with the service provider and improve inquiry resolution efficiency.

The ability to generate increased productivity of the CSR staff through the implementation of tool such as computer telephony integration (CTI), a research repository, response generation tools and administrative tools.

The ability to provide cross-platform integration linking a variety of host based products and transaction processing systems via an easy to use front-end customer servicing system. Specific integration includes but is not limited to the following: computer/telephone integration, e-mail integration, word processor and spell checker integration, and livelink integration.

BRIEF DESCRIPTION OF THE DRAWINGS

The invention will be described with respect to the accompanying drawings, in which like elements are referenced by like numerals, and in which:

FIGS. 7a-7d illustrate an exemplary flowchart of customer management processing according to the invention in another regard.

FIG. 9 illustrates an exemplary sample listing of types of consumer request which the invention may receive and process, in another regard.

DETAILED DESCRIPTION OF PREFERRED EMBODIMENTS

Figure 1:
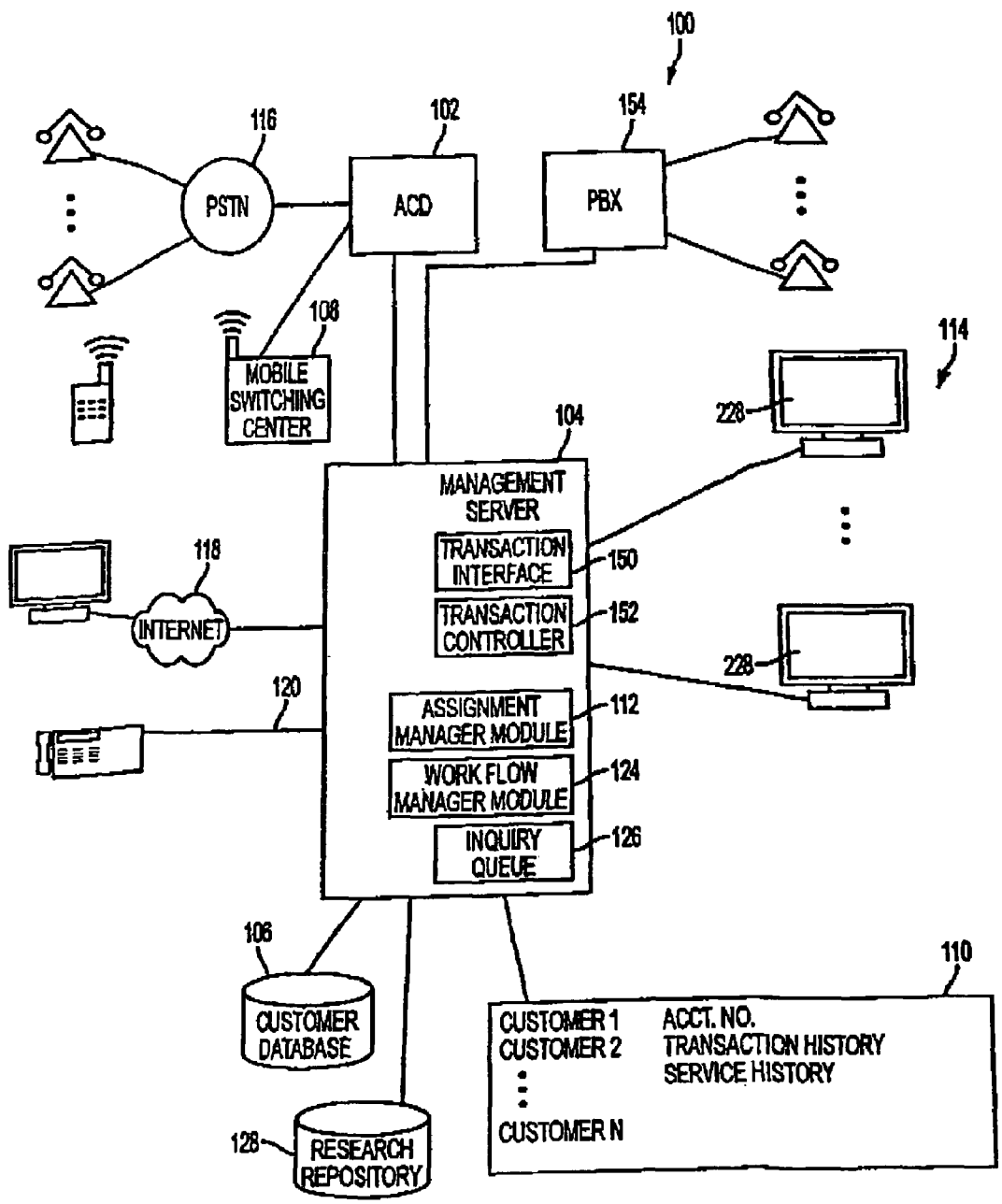
FIG. 1 illustrates an exemplary diagram of a basic system architecture of a customer care operation according to a first illustrative embodiment of the invention.

A systems architecture for a customer management facility according to a first illustrative embodiment of the invention is shown in FIG. 1. As illustrated in that figure, a customer management system (100) includes a management server (104) which coordinates a group of communication channels and customer data resources, for the purpose of advanced customer care and marketing. In one regard, the embodiment shown in FIG. 1 may advantageously employ or incorporate the commercially available Siebel™ database software for use in accessing and deploying consumer data on an site or enterprise-wide level. In the architecture of FIG. 1, consumers seeking technical support, information, follow-up sales, service concerning financial accounts such as cardmember accounts, customer relationship accounts such as registered software users, or other consumer accounts may contact the customer management system (100) through a variety of communication channels.

For instance, customers may dial into the system via the public switched telephone network (PSTN) (116) to an automatic call distributor (ACD) (102) or private branch exchange (PBX) (154) for call forwarding, queuing and similar functions known in the art. Intrasite telephony access may be managed by the PBX (154). The consumers wishing to access the system (100) may likewise access the system (100) via the Internet (118) using Web-enabled browsers, personal digital assistants or other network-enabled devices. Likewise, consumers may reach the system (100) via fax lines (120) or through mobile cellular telephones, which may be Web-enabled, connected via a mobile switching center (108), or through other channels.

Regardless of the channel through which an incoming communication is received, in this architecture of the invention the incoming consumer request is received and serviced by management server (104), which may be or include a personal computer running the Windows™ 95, 98 or NT™, Unix, Linux or other operating system or platforms. The management server (104) may include an assignment manager module (112) and a work flow manager module (124) which cooperate with electronic memory, storage and other resources to facilitate customer management and care. Management server (104) includes or communicates with customer database (106) which stores a consumer profile table (110). Consumer profile table (110) records individual customer account information such as customer name, credit card number, address information, telephone number information, service history information, account usage information and other data fields to assist in customer care and value-added promotion related to the organization's set of customer accounts.

Within the customer management system (100), the incoming inquiries or outbound service fulfillments are performed by the representative community (114), which may be a group of customer service representatives or agents deployed at workstations connected to management server (104). In terms of processing of customer initiated inquiries, if the initiation is via a telephone call over the public switched telephone network (116) or via a cellular phone connected over the mobile switching center (108), an attending representative categorized as an adviser for the purpose of that contact is logged into the AT YOUR REQUEST package, in management server (104). The consumer profile table (110) is then searched for a consumer entry which matches a telephone number of the caller, detected, for instance, by CallerID, ANI or other identification or authentication techniques.

If the telephone information matches a registered entry within the consumer profile table (110), summary information for one or more matching profiles is loaded into a profile search screen of the representative within the representative community (114) handling the call. The adviser then selects an appropriate profile, loads the full profile into the workstation screen and greets the customer communicating via the telephone call. During the pendency of the telephone contact, the representative may edit the customer's profile information contained within the consumer profile table (110), and may personalize the dialog with the consumer by referring to service history or other account information. At this or other junctures the adviser handling the service event may also take an opportunity to promote or suggest attendant products or services related to the present or past inquiries by the customer. Thus for instance, credit customers may be asked of their interest in mortgage banking services.

Conversely, if the incoming telephone contact does not reveal a match based on telephone or other information within the consumer profile table (110), the adviser may enter preliminary information into a profile screen to create a new customer profile entry.

If the initiation of the consumer inquiry is via an e-mail over the Internet (118), a Web page-generated inquiry using HTML or other formats, or communications over the fax line (120), an adviser within the representative community (114) logs into the management server (104) to pull the next e-mail or other communication from an inquiry queue (126). The adviser may view the information contained within the inquiry in the inquiry queue (126) to load the consumer profile table (110) and locate a matching profile.

Once a consumer's inquiry has been registered by way of an existing entry in the consumer profile table (110) or entry of a new profile, the adviser assigned to the service event considers the consumer's request and enters appropriate search term in the management server (104) for processing. For instance, the adviser may click on a button or other icon indicating "create new request", which may spawn entries for entertainment, financial, events and other types of customer activities. The adviser then enters request information into the system (100), and saves the request. Management server (104) then forwards that new request into the resource repository (128), which may be a database containing potential solutions, resources and other information to be provided to customers in response to their needs.

The degree of match of the request to the information available in the research repository (128) may in one embodiment result in an assignment of a level of match to the inquiry, such as level 1 for a reassign event requiring that a request be sent to a research task. If the level of match is greater than 1, the representative's option will be only to close the request, because the request is automatically sent into a research queue for further examination and research by a separately assigned researcher within the representative community (114).

Similarly, if the level of match is determined to be 0, the representative will only be able to proceed with research/fulfillment, by way of an assigned research representative or otherwise. Other gradations are possible, depending on the degree of match through the research repository (128). It will be appreciated that other modes of communication, as well as other modes of real-time research on customer profiles are possible. For instance, the research repository (128) may be located within a single hardware database, or distributed across a network, such as an intranet or the Internet. However, in all cases customer inquiries are methodically processed by individually assigned representatives fulfilling defined roles, and accessing customer profile information in a short, responsive amount of time.

Figure 2:
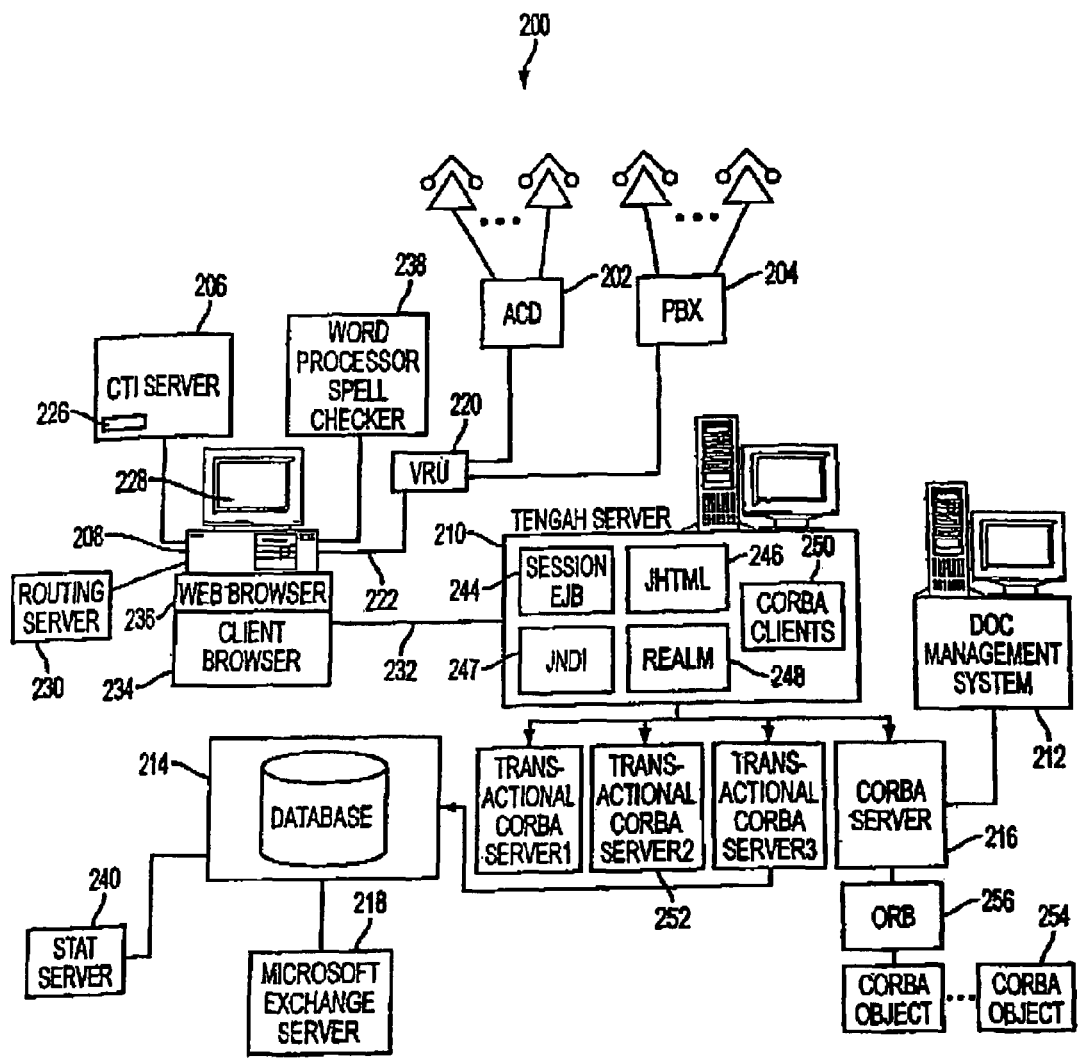
FIG. 2 illustrates an exemplary diagram of a basic system architecture of a customer care operation according to a second illustrative embodiment of the invention.
Figure 3:
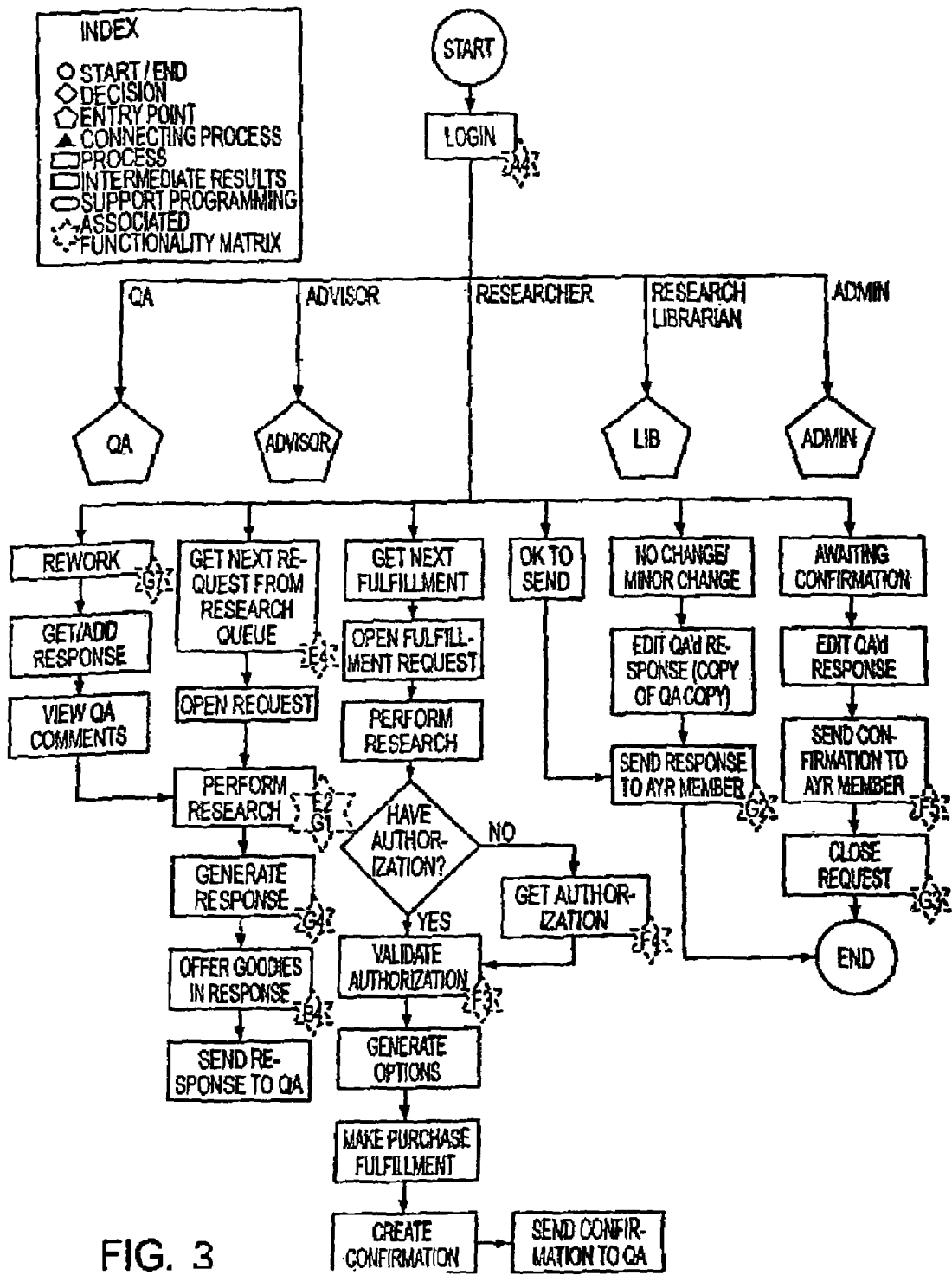
FIG. 3 illustrates an exemplary flowchart of customer management processing according to the invention.
Figure 4:
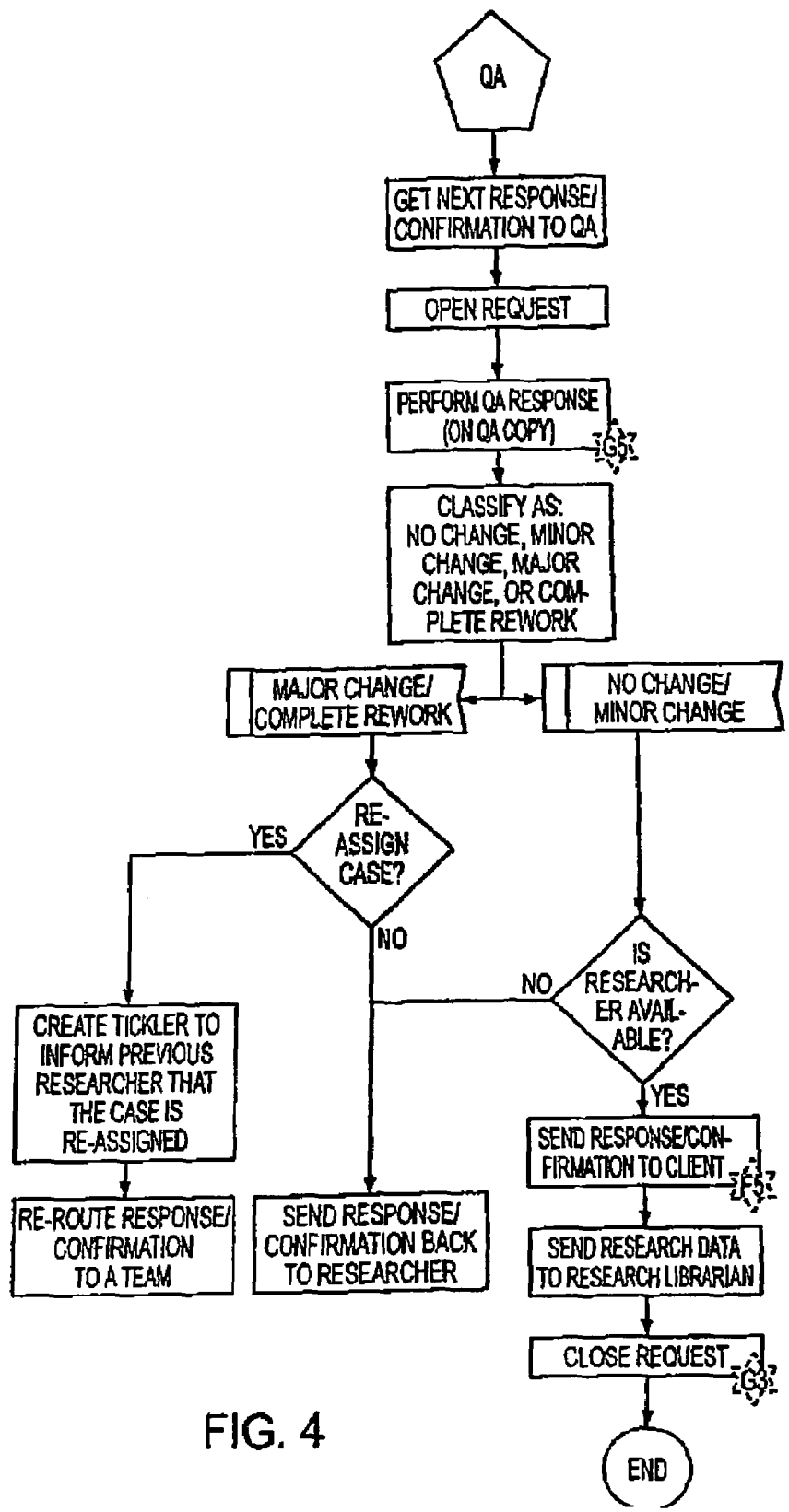
FIG. 4 illustrates an exemplary flowchart of a quality assurance process according to the invention.
Figure 5:
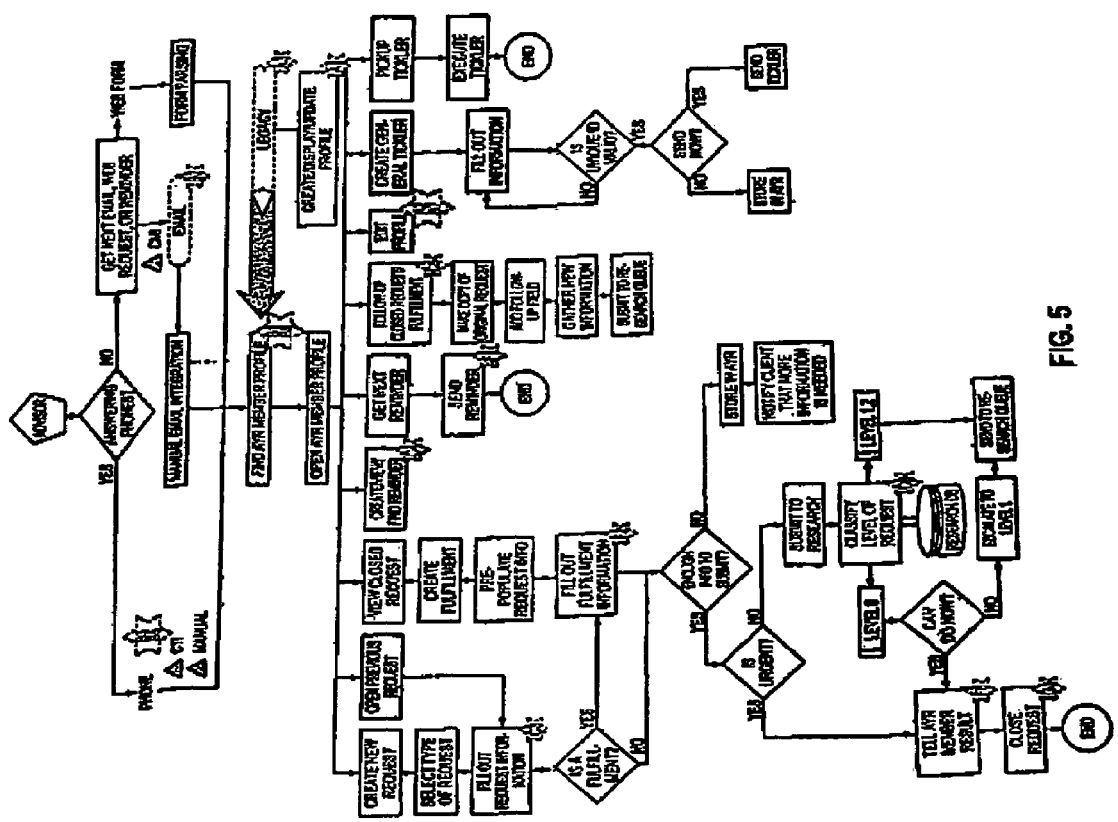
FIG. 5 illustrates an exemplary flowchart of an advisory application according to the invention.

FIG. 2 illustrates an architectural diagram of a computer call center system which can be used to support customer management operations according to a second embodiment of the invention, performing generally similar service, fulfillment and marketing operations as the first. The customer management system (200) of this second embodiment also functions to assist customer management operations to address consumer requests received via electronic mail (e-mail), voice mail, video calls, facsimile (fax) transmissions and other communications media. These transmissions may be transmitted through network connections such as the Internet or intranet, as well as telephone and/or wireless connections to other networks, with the same goals of customer service fulfillment and value-added promotions of a "digital valet" nature.

As illustrated in FIG. 2, an exemplary architecture of the customer management system (200) contains an automatic call distributor (ACD) (202) or a Private Branch Exchange (PBX) (204), a CTI Server (206), a workstation (208), Tengah Server (210), a Document Management System (212), a database (214), CORBA Server (216) and a Microsoft Exchange Server (218).

The embodiment illustrated in FIG. 2 is telephone-based, in which the ACD (202) or PBX (204) or both act as the front end switch for the routing of incoming telephone calls received from public switched or other telephone networks. ACD (202) and/or PBX (204) function as a switch for the system (200) to distribute incoming calls to one or more voice response units (VRU) (220) and other telephony related devices as known in the art. Each workstation (208) contains or is connected to a CTI Server (206) which is directly or indirectly connected to the ACD (202) or PBX (204). ACD (202) and/or PBX (204) are connected over a communication line (222) to the CTI Server (206) to provide outbound call dialing and incoming call routing.

CTI Server (206) provides integration of voice and data applications, such as the integration of telephone and computer systems and telephony services into desktop computers, servers, PBX devices, and other computer-related equipment and services. One feature of the CTI Server (206) is the ability to communicate conversations over in-house computer networks. The system (200) can interface with, for example, Telephony Services API (TSAPI) created by Novell and Telephony API (TAPI) created by Microsoft to enable the system (200) to perform functions such as to answer incoming telephone calls and faxes, forward calls, and provide voice mail. CTI server (206) may include a fax application (226) which receives incoming faxes and displays them in a graphical user interface (GUI) (228) where they can be manipulated by the user as if working in a drawing program.

Another application of CTI Server (206) is the service of Interactive Voice Response (IVR). The IVR feature provides a computerized "operator" service which guides the consumer through button-pushing options when the consumer calls the customer system (200). The consumer is automatically queried for input, for example, "press 1 for sales, press 2 for service."

When a consumer calls the customer management system (200), an automatic number identification (ANI) function within CTI server (206) detects the telephone number from which the consumer is calling. Using the consumer's detected telephone number, the system (200) can automatically retrieve from the database (214) and display on a screen of workstation (208) relevant information about the consumer, such as the consumer's account information, prior purchasing trends or payment history profile.

In this regard, the overall CTI architecture may include the database (214) and routing server (230), as well as the CTI server (206). Database (214) is a database for storing all relevant activities of the CTI subsystem, including the current status and history of all calls in the CTI subsystem. Routing server (230) routes calls to the most appropriate customer service representatives based on factors such as the information contained in the database (214) and the status of various stations in the customer management system (200). CTI server (206) acts as a bridge between the local area network (LAN (232)) and the CTI subsystem. The CTI server (206) is designed to interface with the network services manufactured by different vendors, and present a uniform application program interface (API) to the database (214) and routing server (230).

Data communication lines serve to connect CTI server (206) to workstation (208). Workstation (208) includes a client browser (234) and a Web browser (236). Client browser (234) allows the user to access any information on the client's network, which may be an in-house intranet including LAN (232). Web browser (236) provides a tool for accessing information on any network, an internal intranet or the Internet in HTML or other format.

Workstation (208) is also connected to a WordProcessor spell checker (238). WordProcessor spell checker (238) integrates word processor and spell checker components which are used to create and modify the text of consumer responses. WordProcessor spell checker (238) enhances the system's ability to generate professional outbound correspondence of high quality.

The CTI subsystem also contains a stat server (240), which accesses the database (214). CTI server (206), stat server (240) and associated components are connected by network connection including LAN (232).

In another aspect of the embodiment illustrated in FIG. 2, the Tengah server (210) includes as resources Session Enterprise JavaBeans™ (EJB) (244), Java™ Hypertext Markup Language (JHMTL) (246), Java™ Naming and Directory Interface (JNDI) (246), Realm (248), and CORBA Clients (250). The Session EJB (244) architecture is a server-side component model for the JAVA platform known to persons skilled in the art. Session EJB (244) performs operations of behalf of one or more CORBA clients (250), such as accessing a database or performing calculations. The system (200) incorporates JHTML (246) as a standard format for using JAVA™ in HTML pages for embedding JAVA™ into standard Web pages.

JNDI (248) is an application program interface (API) specified in JAVA™ that provides naming and directory functionality to applications written in the JAVA programming language. Using JNDI, JAVA™ applications can store and retrieve named JAVA™ objects of any type. In addition, JNDI (248) provides methods for performing standard directory operations, such as associating attributes with objects and searching for objects using their attributes.

The incorporation of Common Object Request Broker Architecture (CORBA) into the customer management system (200) allows the system, its components and other applications in this embodiment to communicate with one another no matter where they are located or who designed them. A CORBA Client (250) accesses one or more CORBA Servers (216) to take advantage of the services offered by CORBA objects (254). The middleware of the CORBA application that establishes the client-server relationships between the objects is the Object Request Broker (ORB) (256). Using that resource, a CORBA Client (250) can transparently invoke a method on the CORBA object (254), which can be on the same machine or across a network. The ORB (256) intercepts the call from CORBA Client (250) and is responsible for finding an object that can implement the request, pass it the parameters, invoke its method, and return the results.

The ORB (256) operates without CORBA Client (250) being aware of where the object is located, its programming language, its operating system, or other system aspects that are not part of an object's interface. In so doing, the ORB (256) provides the system (200) with interoperability between applications on different machines in heterogeneous distributed environments, and seamlessly interconnects the system (200) with multiple object systems.

The CORBA Client (250) is the entity that performs an operation on the ORB (256) and the object implementation is the code and data that actually implements the object. Objects on the ORB (256) can act as either a client or server, depending on the occasion. Object implementations can be written in a variety of languages including C, C++, Java™, Smalltalk, and Ada.

The illustrated transactional CORBA Servers 1, 2, and 3 (252) permit online transaction processing to be executed immediately, as opposed to batch processing in which a set of transactions is stored and executed later.

Document management system (212) stores, categorizes and retrieves documents, spreadsheets, graphs, and imaged (scanned) documents. The system (200) assigns each document an index-card-like record that hold information such as the author, document description, creation date, and type of application used to create the document. The system (200) archives this information for future access when needed to support customer inquiries or other functions.

Database (214) is another client/server-based data resource application which operates over a network to manage data, accept queries from the users, and respond to those queries. Database (214) is also capable of implementing functions such as (1) providing a way to structure data as records, tables, or objects; (2) accepting data input from operators and storing that data for later retrieval; (3) providing query languages for searching, sorting, reporting, and other "decision support" activities that assist the users to correlate and interpret collected data; (4) providing multiuser access to data, along with security features that prevent some users from viewing and/or changing certain types of information; (5) providing data integrity features that prevent more than one user from accessing and changing the same information simultaneously; and (6) providing a data dictionary that describes the structure of the database, related files, and record information.

File sharing functionality may be provided by Microsoft Exchange Server (218) or other linking technology which integrates electronic mail, scheduling, electronic forms, and document sharing into the system (200). Furthermore, the Microsoft Exchange Server (218) connects with the Internet and other networks outside the system (200) to provide access to global information. With the use of Microsoft Exchange Server (218), the system (200) allows the user to perform such tasks as creating, sending, viewing and storing messages or other types of information. Microsoft Exchange Server (218) may run on such applications as Microsoft Windows™ NT, Windows™ 95 or 98, Macintosh™ OS, UNIX™, Linux and other computers.

In terms of overall customer management processing, as illustrated in FIGS. 3-6 and FIGS. 7a-7d and 8, a managed workflow process for each internal representative begins when he or she accesses the customer management system. This processing flow is independent of implementing architectures, which may be adapted to vendor needs. Upon representative access, the customer management system automatically assigns the representative to perform a unique, predefined role to execute customer care, fulfillment and promotion. The system has several categories of such roles to assign to individual representatives. That assignment may be based on each representative's profile (i.e., training, level of expertise, and language fluency) stored in database (214).

The system may assign a representative to serve as an advisor, a researcher, a quality assurance representative, a librarian, or an administrator within the system, among other roles. An identification code, the representative's social security or some other preassigned password may be entered by to access the system. Any information may be entered into the system by keyboard, voice activation, touch screen interface, pen, computer mouse entry, or other interfaces. Several such roles will now be described.

In the role of an advisor, the representative handles all incoming consumer requests, reminders, follow-ups, and/or fulfillments. Other responsibilities of an advisor include creating and/or updating consumer profiles, researching requests which can be handled immediately, and answering vendor calls.

The system provides each representative is an advisor role with the following associated functionality or resources which are displayed on the workstation's screen and are selectable through the point-and-click feature of the GUI (228):

Associated Functionality (Screens)
User Login
Advisor Menu
Consumer Member Lookup
Consumer Member Profile
Previous Requests/Reminders associated with specific Consumer Member
Requests with Status: Need More Info
Requests with Status: Awaiting Vendor Calls Requests (Information/Fulfillment): Travel, Entertainment, Find Me, Financial (Request Summary, Request Specific Information, Fulfillment)

Research—(Request Summary (read only), Resources (read only), Options (read only), Notepad (read only), Response (editable), Advisor Comments (editable))

Reminders—New (Creation)

Reminders—Find (View)

Ticklers—New (Creation)

Tickler—Find (View)

A representative assigned to function in the role of a researcher in turn will perform all research associated with a request. A researcher is responsible for completing and sending the consumer a response to their inquiries such as a request, a follow-up, and/or a fulfillment. The researcher ensures that their responses have been approved by a QA representative before being sent to the consumer, and, if a response must be made by calling the consumer, the researcher is responsible for handling such a response. Researchers are organized into logical groupings, depending on their areas of research expertise. Researchers may handle specific types of requests regarding certain topics such as travel, entertainment, find me or financial. The specific type of requests that an individual researcher will handle is determined and assigned in their user profile.

Each researcher performs his or her functions through the use of the following associated functionality and resources which are displayed on the GUI (228) selectable by mouse to point-and-click icons or other media, representing the functions on the GUI:

Associated Functionality (Screens)

User Login

Researcher Menu

Researcher Briefcase

AYR Member Lookup

AYR Member Profile

Previous Requests associated with specific AYR Member

Request Summary

Research—(Request Summary (read only), Resources (editable), Options (editable), Notepad (editable), Response (editable), Advisor Comments (read only))

Ticklers—Creation

Ticklers—View

Get Next Request

A Quality Assurance (QA) representative in another role is responsible for assuring that all request responses and fulfillment confirmations are correct to the best of their knowledge. The QA representative may edit and send off the consumer's response, but often makes only minor edits and return all work back to the researcher. The researcher must receive prior approval from the QA representative before sending a response to a client.

To ensure the accuracy of the response, each QA representative performs his or her tasks again by interacting with the system's GUI (228) to select the following associated functionality and resources:

Associated Functionality (Screens)

User Login

QA Menu

Request Summary

Research—(Research Summary (read only), Resources (read only), Options (read only), Notepad (read only), Response (editable), Advisor Comments (editable))

Ticklers—Creation

Tickler—View

The responsibilities of the research librarian include maintaining information received in the research library and assuring that this information is updated and valid. The research librarian is also responsible for updating the library with the researcher's suggestions.

In order to enhance the performance of his or her role, each librarian is provided with the following associated functionality and resources, once more accessible through the GUI (228):

Associated Functionality (Screens)

User Login

Librarian Options Menu

Request Summary

Research—Search Results/Notepad

Research—Options

Ticklers—Creation

Ticklers—View

The role of an administrator within the system includes maintaining the system's user community, monitoring and managing queues, and creating general broadcast ticklers.

Each administrator performs his or her functions through the use of the following associated functionality and resources, through the GUI (228):

Associate Functionality (Screens)

User Login

Administrator Menu—(User Management, Queue Management)

Request, Reminder, Tickler and Inbound E-mail queues

When the representative in each role selects an associated function, the system may display the requested information in a format so that it may be edited by that representative, only read by the representative, modified by the representative to create a new document and/or only viewed by the him or her.

Figure 6:
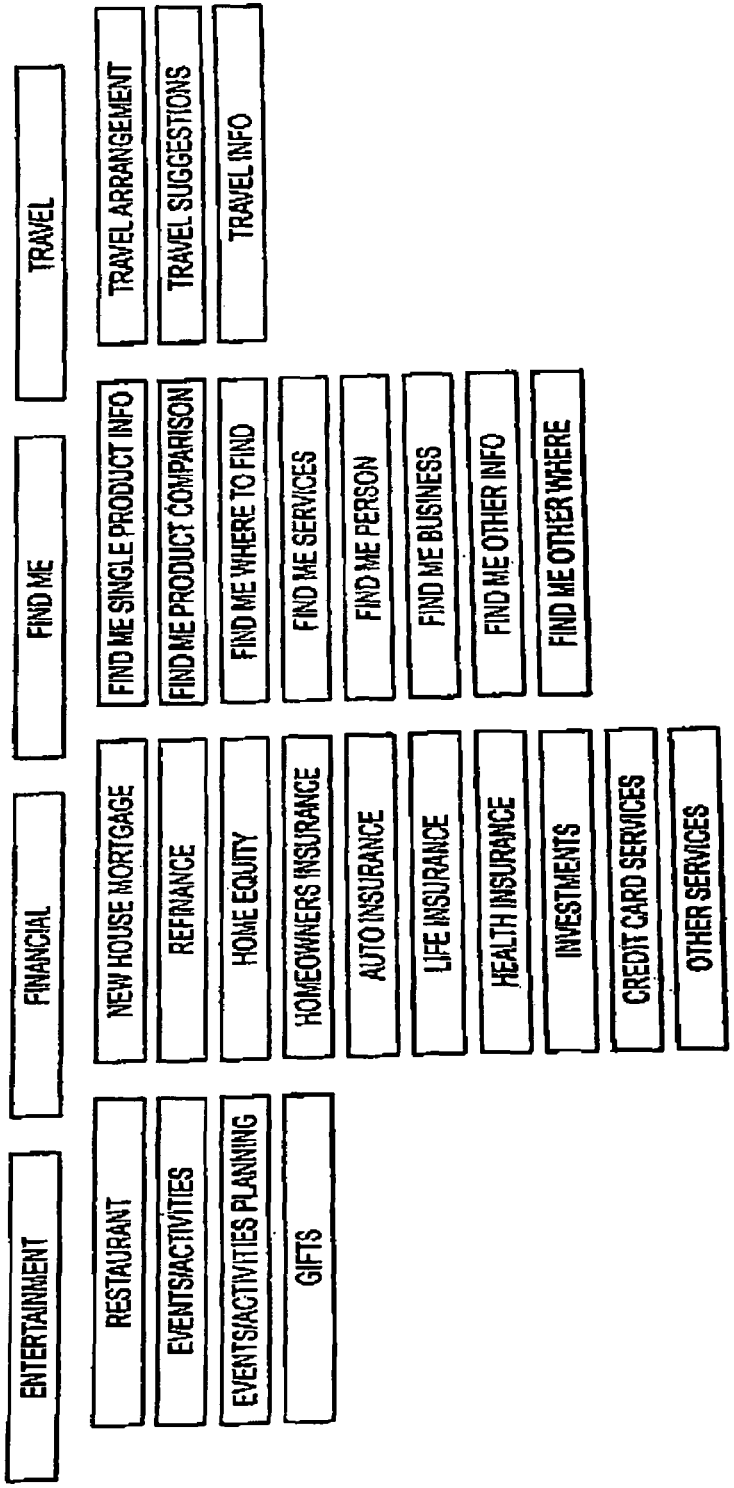
FIG. 6 illustrates an exemplary sample listing of types of consumer requests which the invention may receive and process.
Figure 7A:
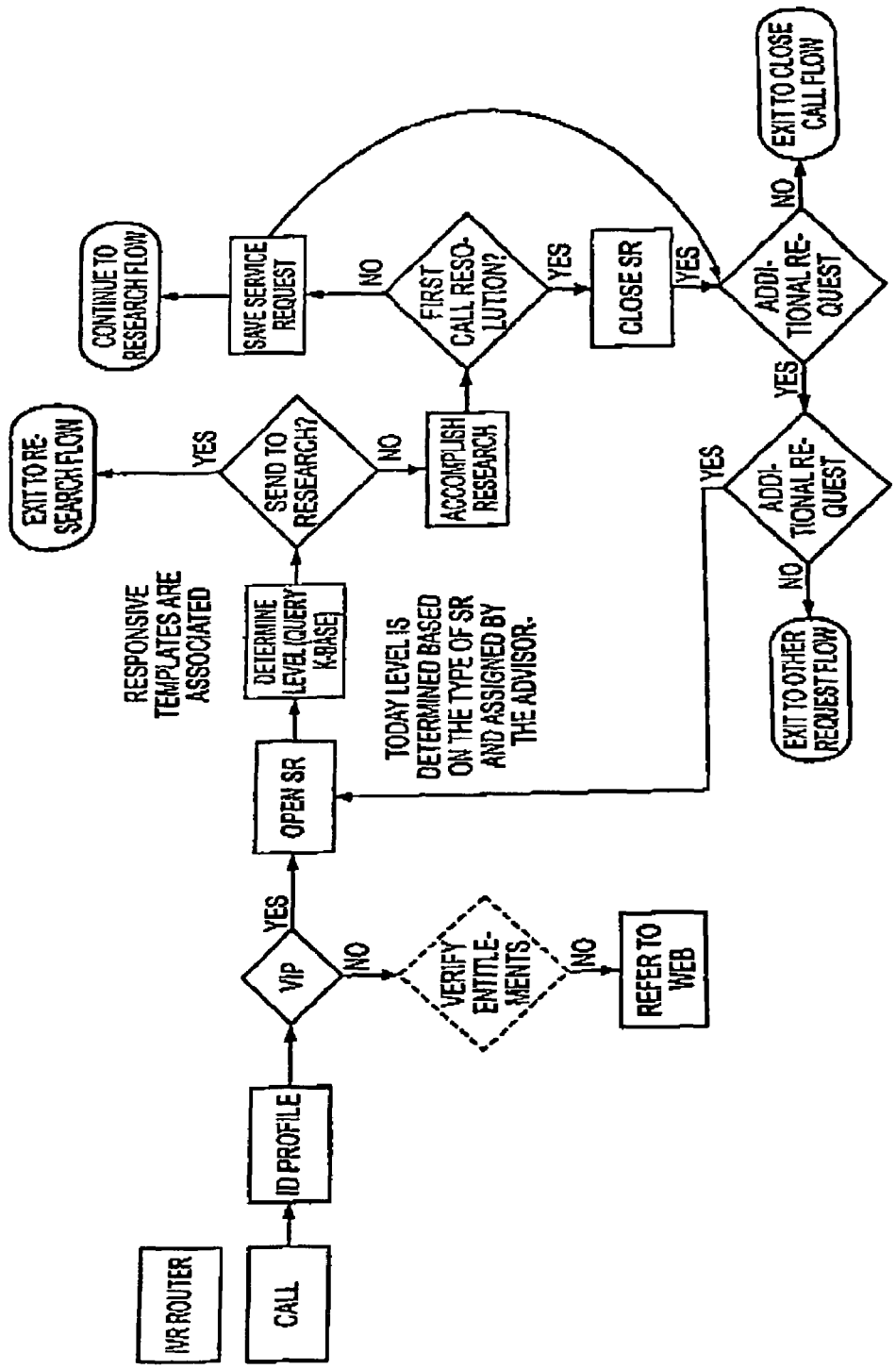
Figure 7B:
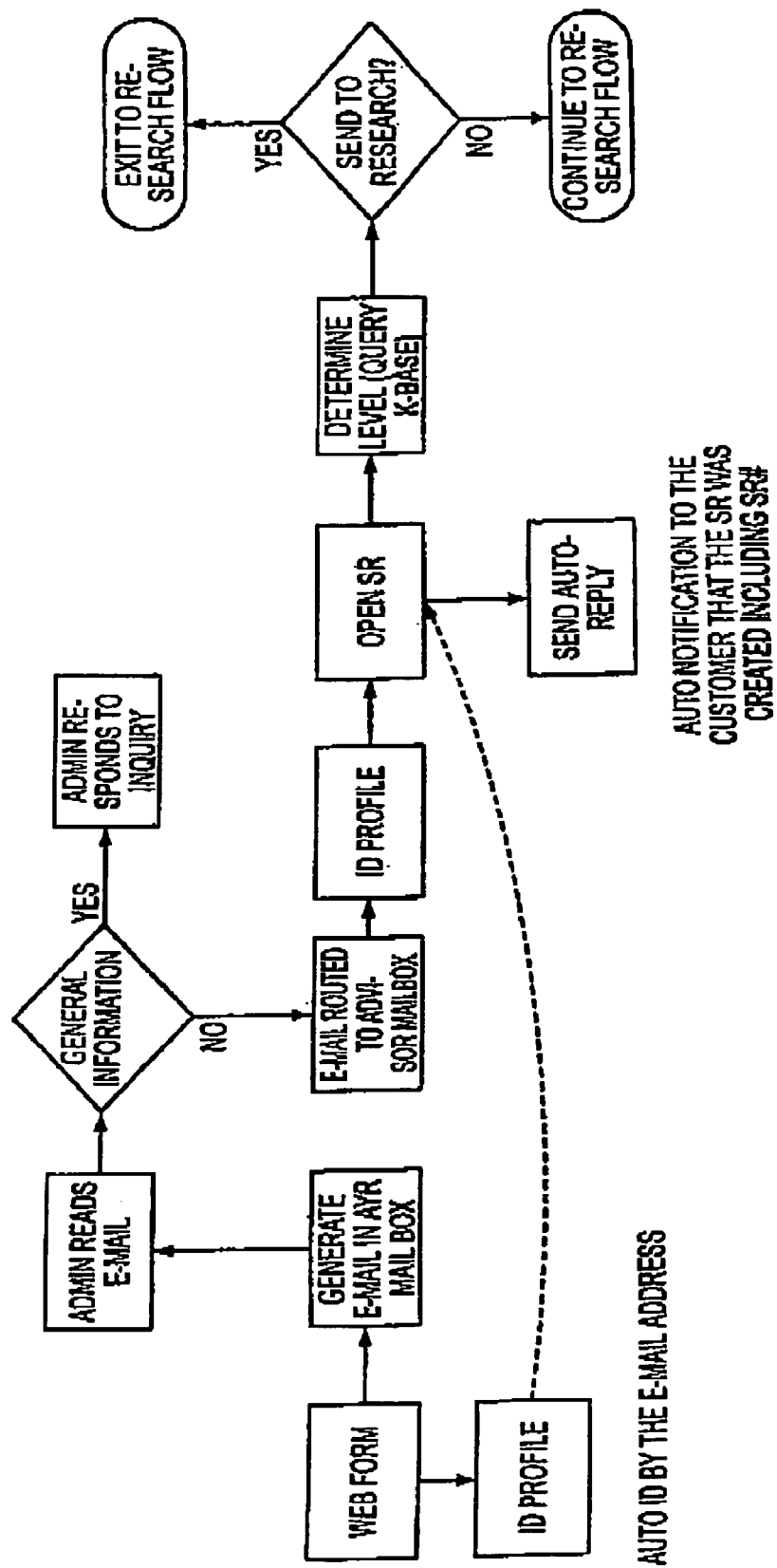
Figure 7D:
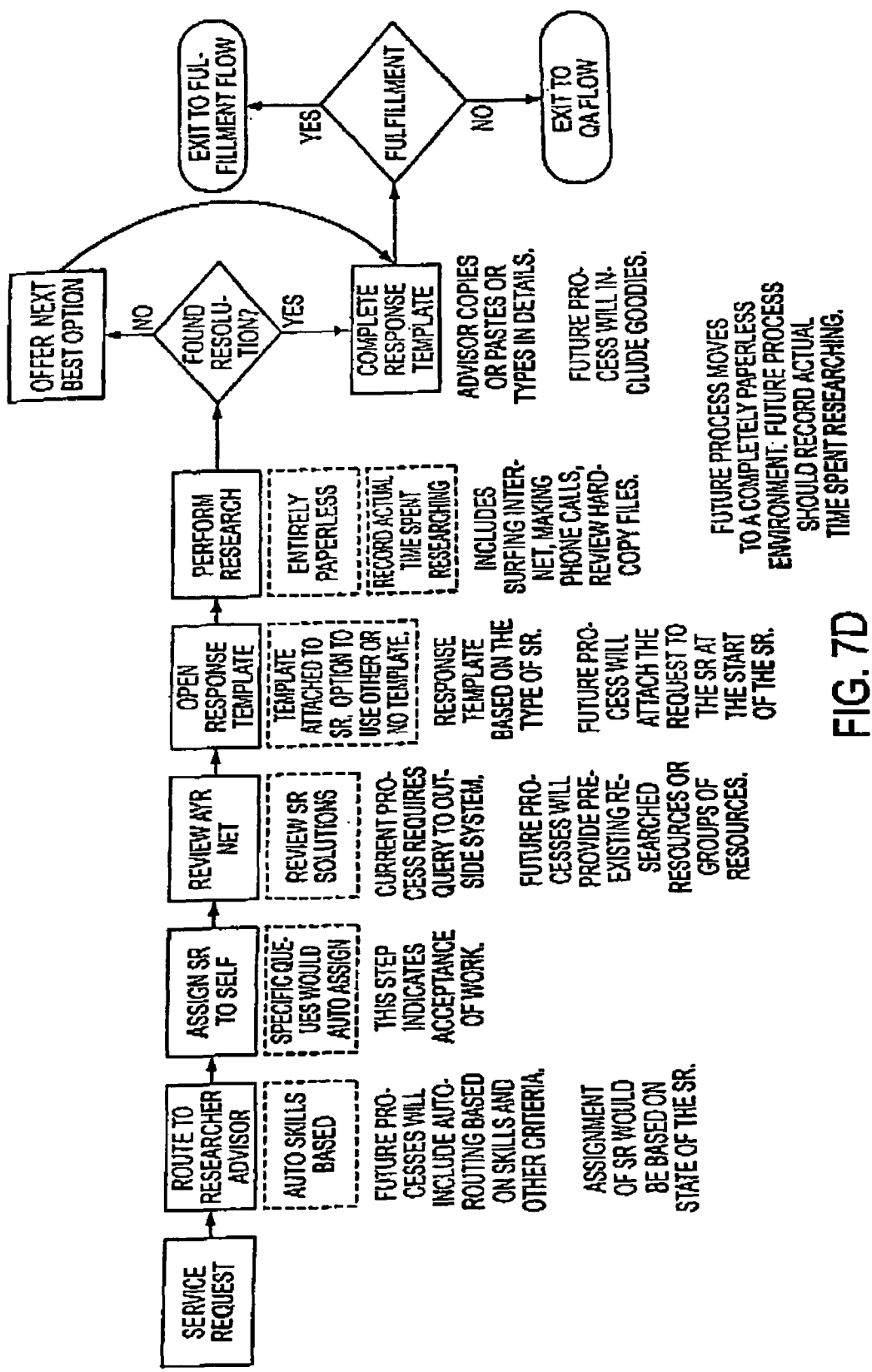
Figure 8:
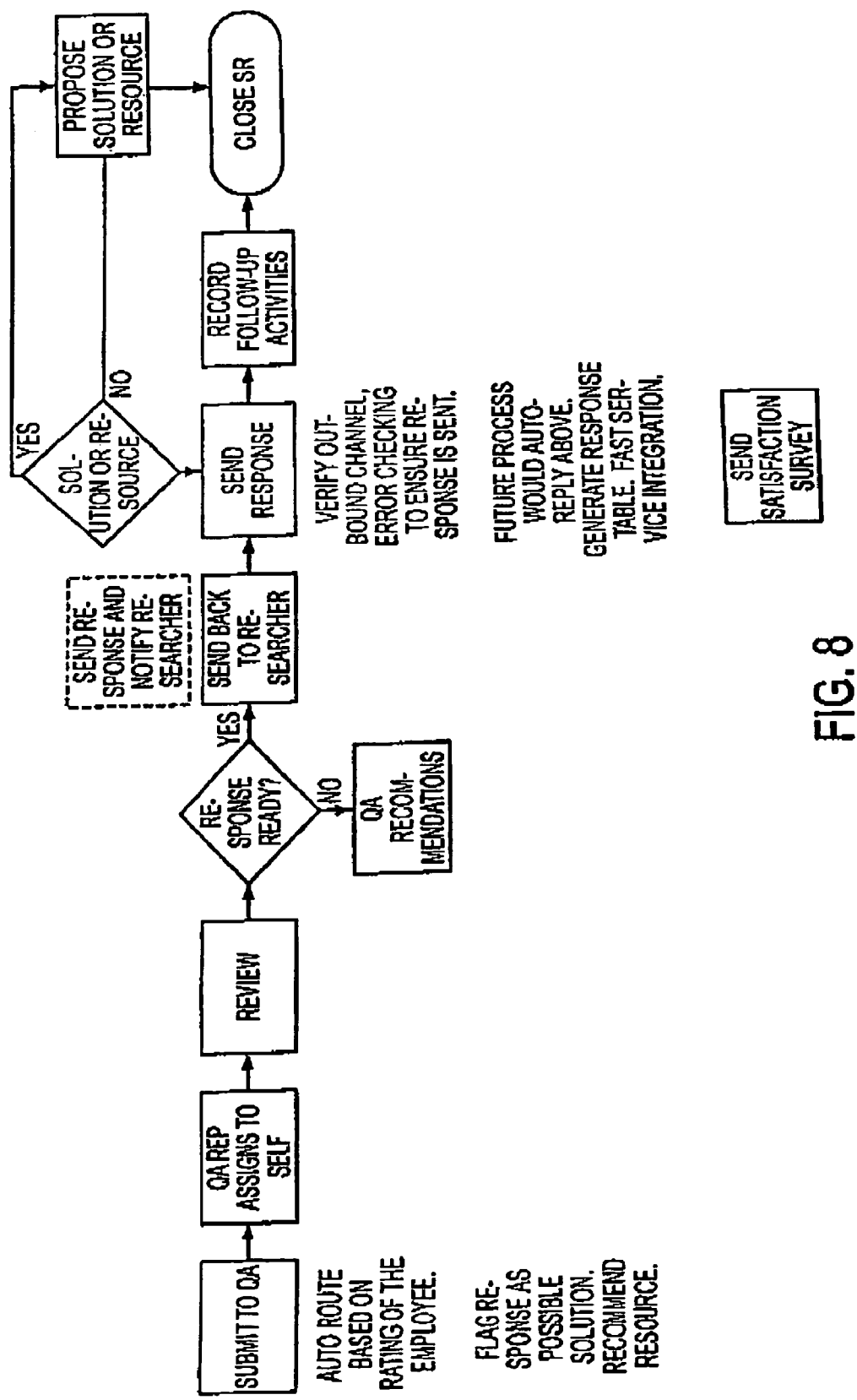
FIG. 8 illustrates an exemplary flowchart of a quality assurance process according to the invention in another regard.

The invention is capable of handling several different types of consumer requests. FIGS. 6 and 9 illustrate types of consumer requests which may be organized by the invention into four major illustrative categories: (1) Entertainment, (2) Financial, (3) Find Me, and (4) Travel. Each Request category may be further defined into sub-categories: (1) Entertainment—Restaurant, Events/Activities, Events/Activities Planning, or Gifts; (2) Financial—New Home Mortgage, Refinance, Home Equity Loan, Homeowners Insurance, Auto Insurance, Life Insurance, Health Insurance, Investments, Credit Card Services or Other Services; (3) Find Me—Find Me Single Product Info, Find Me Product Comparison, Find Me Where To Find, Find Me Services, Find Me Person, Find Me Business, Find Me Other Info, or Find Me Other Where; (4) Travel—Travel Arrangement, Travel Suggestions, or Travel Info.

Once the consumer's request enters the customer management system, the system routes the request to the most appropriately skilled representative assigned to an appropriate functional role, to best meet the customer's need.

The invention is thus dedicated to customer service, customer support, inside sales and information fulfillment. The invention benefits from enhanced call control to speed up record retrieval, route a call, escalate a caller issue, or assign a fulfillment agent. To optimize productivity, the invention automatically suggests cross selling and up-selling scripting to the user. Furthermore, the customer management system may automatically employ statistical and adaptive marketing techniques to incoming calls in an effort to maximize the call value for both the consumer and the service company.

Cross-selling scripting involves automatic scripts which appear on the workstation's screen to enable the representative to attract the consumer to add products or service to the consumer's current shopping cart of products and services. For example, the system may suggest that the user try a discounting technique to attract the consumer to purchase a more profitable product or service or purchase a product or service that better serves the consumer's needs. The up-selling feature of the invention involves moving the consumer to a more expensive product or service offering based on specific script outcomes, the consumer's status, the payment or financial history of the consumer or any other pre-programmed criteria entered into the management system.

Statistical techniques may be employed by the invention to garner more information from the consumer so as to best identify the consumer's needs, a consumers' purchasing trends, trends within a population of consumers or demographics. This feature provides the invention with more detailed and accurate information for future marketing and product development initiatives.

In any embodiment, the system's adaptive marketing function assists the representative to move other products and services to the consumer, in real time while the user is actually engaged in a telephone call with the consumer. Based on historical information about the consumer's profile, usage characteristics, previous communications, product and service offering types and availability and price structures, as well as the financial profile and history of the consumer, the assigned representative is presented a best-fit, contextual script to implement adaptive marketing.

The invention is capable of handling and processing inbound and outbound calls and other contacts. Furthermore, the invention in another regard may integrate credit card authorization directly into the call center application.

As discussed above, consumers surfing the Internet may access the invention via a Web page being viewed by the consumer. Collaboration with the Internet allows a consumer seeking products and services via the Internet to interact in real time with a representative via the Internet. Fulfillments including product and service types, specifications and ordering forms which can be pushed to the customer's Web browser on-demand.

In terms of Internet-based processes, the consumer can either request the intervention on their own as required by clicking a notification button strategically incorporated into a Web page, or depending on the business model, the intervention can be directed by the organization hosting the Web service. Control of the interactive session by the customer service representative can be established by secure login from any Web browser anywhere.

In this respect, in another regard the embodiment illustrated in FIG. 1 provides a transaction interface (150) which receives the transactions as they enter the customer management system (100). A transaction controller (158) processes transactions received and sent through the transaction interface (150) and controls a queue (126) to store received transactions. The transaction controller (152) automates the flow of the cardmember's request ensuring that the requests are handled quickly and efficiently. For example, the customer management system (100) responds to an e-mail and telephone requests within 48 hours, and an Internet request is processed within 24 hours after the request enters the system. As noted, the operation of the system (100) may incorporate an automatic call distribution (ACD) or private branch exchange (PBX) which are commonly known in the art.

Web center systems manage information about the interaction in an analogous fashion to the traditional call center. Further, customer service representatives can monitor the Web facility, in real time, and view information about the guest such as IP address and the name registered to it, which Web page is being viewed and for how long. Other detailed information such as the Web page viewing history by guest, and type of previous interaction can be garnered.

Web center systems can push existing Web content and screen snap shots onto a guest's browser and also push other fulfillment such as word processor, spreadsheet, any image and viewable file in native form onto the guest browser. These files can be viewed by the Web guest so long as the guest has the applications that can process the files delivered to their machine. It is also possible to add voice interaction over the Web through "click and talk" Voice-over-IP functionality, allowing the visitor to talk directly to a representative.

The invention has been described with respect to particular embodiments which are intended to be illustrative rather than restrictive. Other embodiments and configurations will become apparent to those skilled in the art, without departing from its spirit and scope. The scope of the invention is accordingly intended to be limited only by the following claims.

What is claimed is:

1. A call processing system that is configured for:

receiving information related to an incoming call that relates to cancellation of a service or change of the service to a particular product or a new service; and determining how to route the incoming call based on the received information, wherein determining how to route the incoming call comprises assessing a priority of the incoming call and assigning a priority value indicative of the assessed priority to the incoming call, wherein the determination of how to route the incoming call is related to the priority value, wherein determining how to route the incoming call further comprises assessing whether an account associated with the incoming call is likely to be profitable in the future or is not likely to be profitable in the future wherein the incoming call is routed to a group of customer service representatives if the account associated with the incoming call is likely to be profitable in the future, wherein at least one of the individual customer service representatives within the group is assigned to the group based on one or more of the individual customer service representative's talent for performing one or more particular tasks, wherein the system is further configured for measuring an individual customer service representative's talent to perform the one or more particular tasks based on one or more of the individual customer service representative's saved revenue rate performance, the individual customer service representative's sales rate performance, the individual customer service representative's sold revenue rate performance or the individual customer service representative's persistency rating.

2. The call processing system of claim 1, wherein the tasks relate to persuading customers to retain the service or to persuading customers to replace the service with a particular product or a new service.

3. The call processing system of claim 2, wherein the system is configured for measuring an individual customer service representative's talent to persuade customers to retain a service or to replace the service with a particular product or a new service based on one or more of data comprising the length of time that one or more customers retained a service after speaking with the individual customer service representative, the individual customer service representative's save rate for one or more days, the individual customer service representative's revenue value for one or more days or the number of customers that are persuaded by the individual customer service representative to replace the service with a particular product or a new service for one or more days.

4. The call processing system of claim 1, wherein the service comprises an insurance policy, a debt cancellation contract, a debt protection contract or a data deferment contract.

5. The call processing system of claim 1, wherein a caller associated with the incoming call is allowed to cancel or change the service without the assistance of a customer service representative.

* * * * *